US00RE39402E

(19) United States
(12) Reissued Patent
Chauvet et al.

(10) Patent Number: US RE39,402 E
(45) Date of Reissued Patent: Nov. 14, 2006

(54) INFLATABLE HOOP/BASKET/GOAL

(75) Inventors: Philip G. Chauvet, 6644 Rippling Brook S.E., Salem, OR (US) 97301; Rod L Blair, Bakersfield, CA (US)

(73) Assignee: Philip G. Chauvet, Salem, OR (US)

(21) Appl. No.: 10/735,570

(22) Filed: Dec. 12, 2003

Related U.S. Patent Documents

Reissue of:
(64) Patent No.: 6,629,899
Issued: Oct. 7, 2003
Appl. No.: 10/053,988
Filed: Jan. 19, 2002

U.S. Applications:
(60) Provisional application No. 60/262,793, filed on Jan. 22, 2001.

(51) Int. Cl.
*A63B 67/00* (2006.01)

(52) U.S. Cl. ..... 473/472; 473/466
(58) Field of Classification Search ..... 473/472, 473/466
See application file for complete search history.

(56) References Cited

U.S. PATENT DOCUMENTS 2,561,016 A * 7/1951 Ford et al. ..... 40/603
4,815,153 A * 3/1989 Bleser et al. ..... 5/98.1
5,546,707 A * 8/1996 Caruso ..... 52/2.13
5,720,678 A * 2/1998 Korthauer ..... 473/415
5,733,158 A * 3/1998 Higginbotham et al. ..... 441/38
5,865,693 A * 2/1999 Johnson ..... 473/478
6,077,138 A * 6/2000 Schulze ..... 441/40
6,447,426 B1 * 9/2002 Peterson ..... 482/27

OTHER PUBLICATIONS

DIA Web Page Ad www3.diynet.com/DIY/article/0,2058, 3485.00.html, Dec. 1999.*

* cited by examiner

*Primary Examiner*—Stephen Blau
*Assistant Examiner*—M. Chambers
(74) *Attorney, Agent, or Firm*—John S. Artz; Artz & Artz, PC

(57) ABSTRACT

A free standing, upright sports goal structure (10) having a plurality of inflatable bladders to form the framework (19) of a standing goal structure, together with an outer casing (25) of non-elastic material which encloses the inflatable framework (19) and serves to form a strong rigid goal structure (10) which is useful in a plurality of sports, yet which can quickly and easily be erected or collapsed for convenient transportation and storage.

46 Claims, 6 Drawing Sheets

19
14
25
27
42"d
57"d
71"
Square 19
25
26
ZIPPER
FOR
BLADDER
11
18"

24"
NET
96"
High

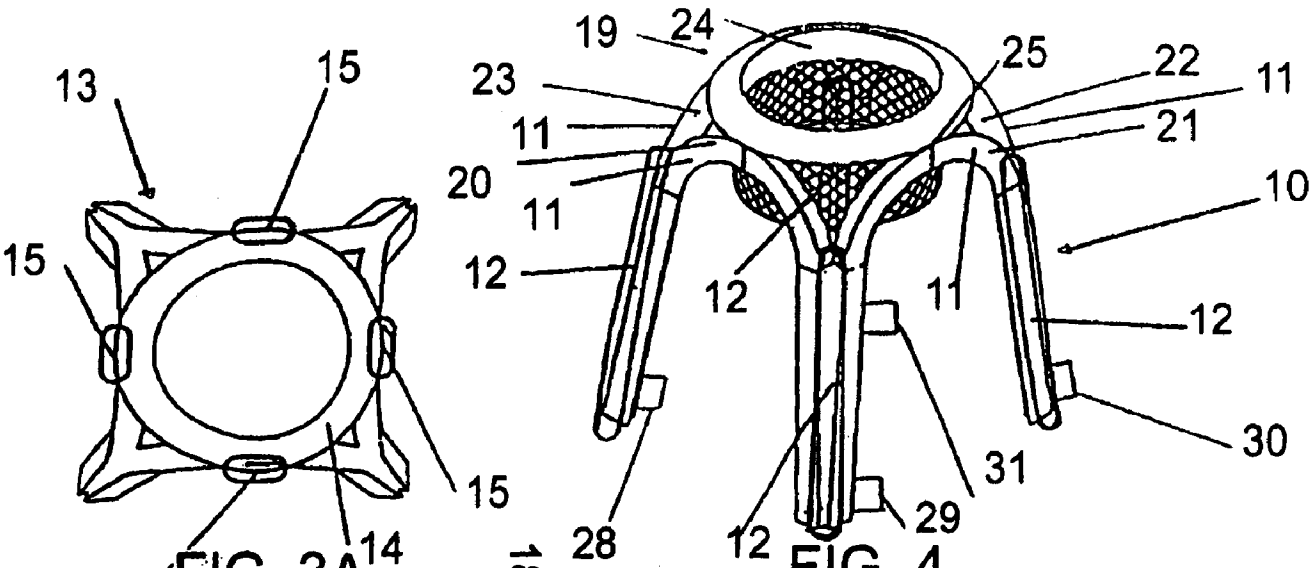
FIG. 4
FIG. 3A
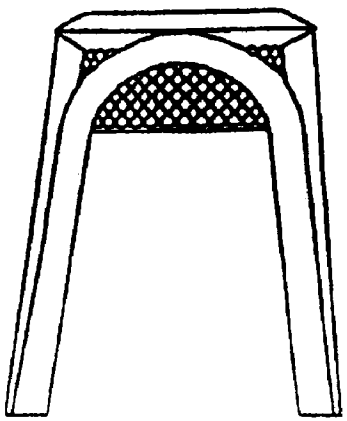
FIG. 1A
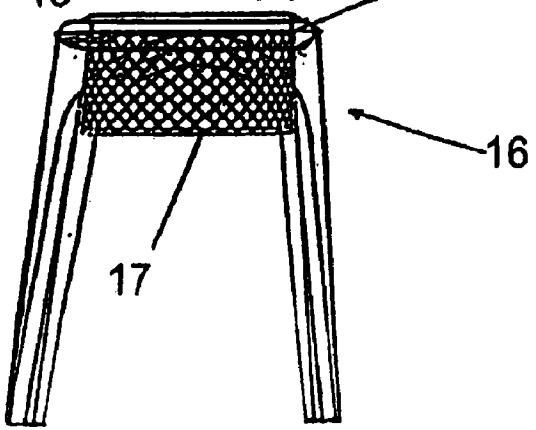
FIG. 2A

INFLATABLE HOOP/BASKET/GOAL

Matter enclosed in heavy brackets [ ] appears in the original patent but forms no part of this reissue specification; matter printed in italics indicates the additions made by reissue.

This application is a continuation of my provisional patent application Ser. No. 60/262,793, filing date Jan. 22, 2001.

The present invention relates to an inflatable Hoop,/Basket,/Goal. Such structures may be used for a variety of purposes but principally this structures proposed use is for a recreational aid in the form of a goal or hoop that allows the user to throw, shoot, or kick a ball or object through the goal or hoop. The inflatable hoop/basket/goal can be used on any surface, indoors or outdoors. The invention is portable and being inflatable makes it easily assembled (Inflated) and stored.

The present invention provides an inflatable tubular framework comprising of inflatable tubular members. When inflated the tubular uprights (Legs) joined by the arches that are attached to the goal or hoop create a self supporting structure. An internal bladder system gives the structure its sturdyness. The inflatable tubular members can be made of plastics or strong fabric. They can be welded, glued or sewn together. The internal bladders can be made of plastics or rubberised fabrics that will seal air tight. The netting may be made of plastics or a yarn material.

Preferably, a plurality of anchorage points are provided along each tubular member intended in use to be lowermost. Anchorage points may also be provided on tubular members intended in use to be lowermost. Anchorage points may also be provided on tubular members intended to be at an upper part of the structure in use and guylines may be attached at these points in the form of ballasts.

Suitably, the framework structure may be provided in association with means for anchoring or weighing down the structure, such as weighted lines or pegs or stakes for driving into the ground. Preferably means for weighing down the structure are provided comprising a plurality of containers/ballasts such as bags adapted to be filled in use with a material such as sand or soil or with a liquid such as water.

Preferably, the anchorage points mentioned above may be provided as protruding tabs of the material of the inflatable structure provided with reinforced holes therein for receiving anchorage lines or ballasts.

It can be seen that the tubular frameworks illustrated can, when deflated, be stored in a compact and convenient manner and can conveniently be transported for use at the beach or on picnics or in other recreational situations. They may then be inflated by the use of a conventional foot pump or other compressed gas source to provide in a very short time a goal/hoop or basket for use in a game of basketball, soccer, ect.

Whilst the invention has been described with reference to specific characteristics of the embodiments illustrated, many modifications and variations are possible with the scope of the invention.

BACKGROUND OF INVENTION

1. Field of Invention

This invention relates to inflatable structures and is particularly directed to portable inflatable structures for indoor and outdoor use as a sports goal, hoop, or basket.

2. Prior Art

In the past there have been numerous types of inflatable objects, such as balloons, simulated furniture, and various types of flotation devices. This invention is of an upright, free standing, inflatable goal, hoop or basket. It is composed of inflatable portions which are interconnected and include four equally spaced legs. Each leg in turn is connected by an arched section. Each arched section is attached to the circular hoop or goal creating one complete structure. A mesh netting is attached to the interior circumference of the circular hoop, hanging from the hoop or basket.

OBJECTS AND BRIEF SUMMARY OF THE INVENTION

An object of the present invention is to provide an inflatable sports goal which is strong and rigid when erected.

Another object of the present invention is to provide a free standing, upright sports goal which is strong and rigid when erected, yet which can quickly and easily be disassembled for portability and storage.

An additional object of the present invention is to provide a free standing, upright sports goal comprising an inflatable framework, together with a casing formed of non-elastic material, to form a sports goal which is strong and rigid when erected, yet which can quickly and easily be disassembled for portability or storage.

A specific object of the present invention is to provide a free standing, upright sports goal structure having a plurality of inflatable tubes joined to form the framework of a free standing, upright goal structure, together with an outer casing of non-elastic material which encloses the inflatable framework and serves to form a strong rigid goal structure which is useful in a plurality of sports that would include basketball, soccer or any ball game played with the goal, yet which can quickly and easily be erected or collapsed for convenient transportation and storage, together with an improved method of manufacturing the same.

These and other objects and features of the present invention will be apparent from the following detailed description, taken with reference to the figures of the accompanying drawing.

BRIEF DESCRIPTION OF DRAWINGS

FIG. 4 is an isometric view showing the inflatable framework for the sports goal of FIG. 1;

DESCRIPTION OF THE PREFERRED EMBODIMENT

Figures 1, 2, 3:
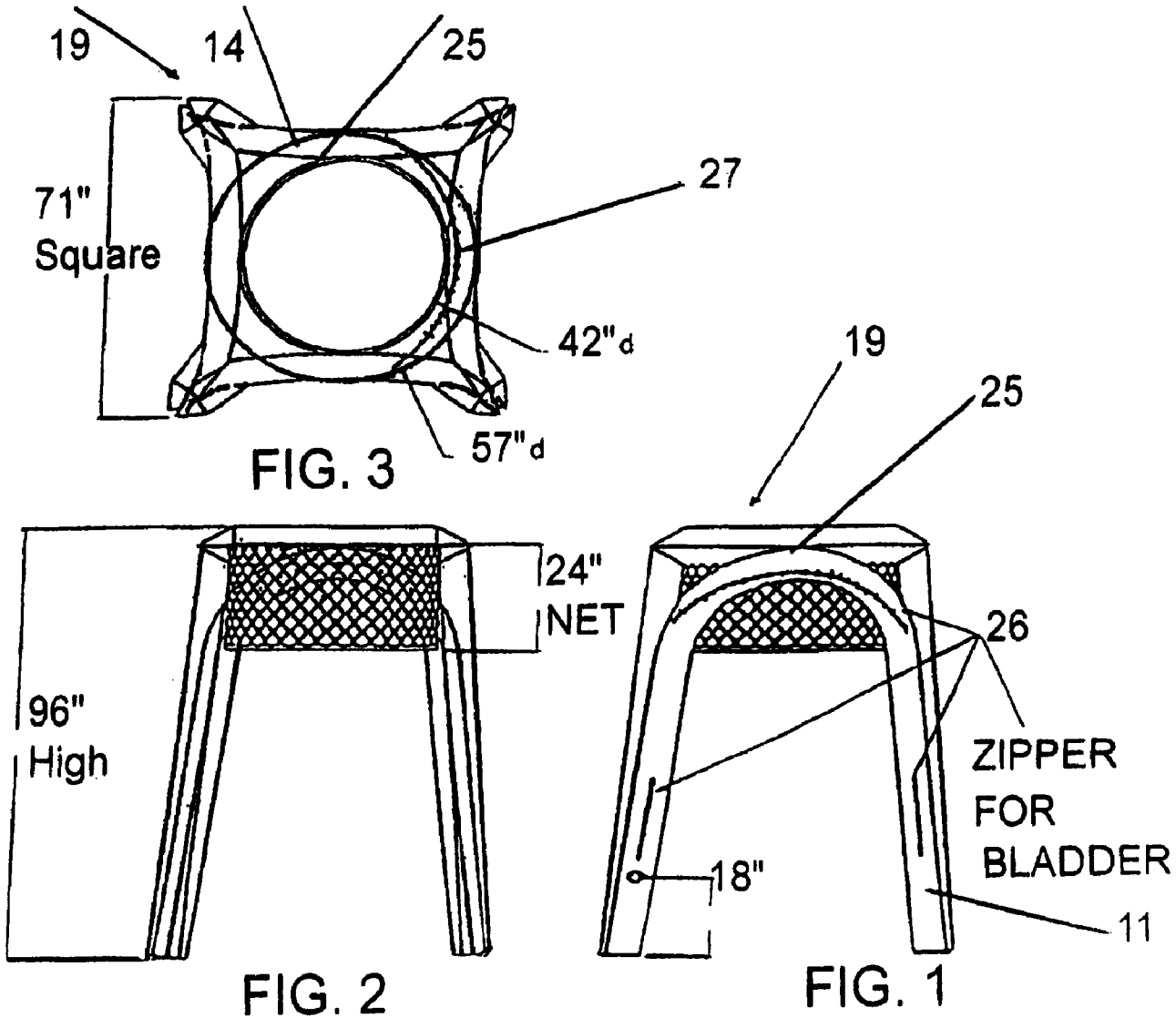
FIG. 1 is a front view of a sports goal embodying the present invention.
FIG. 2 is a cut out side view of the sports goal of FIG. 1.
FIG. 3 is a top view of the sports goal of FIG. 1.
Figure 6:
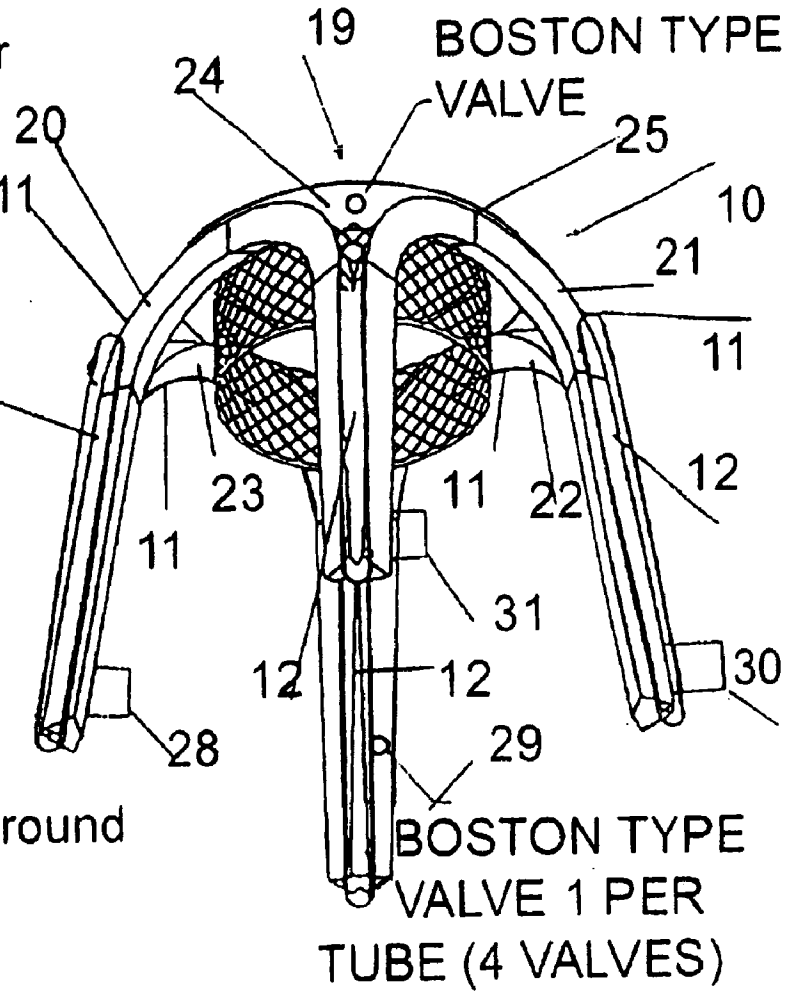
FIG. 6 is an isometric view of the sports goal showing the inflation/deflation valve location.
Figure 5:
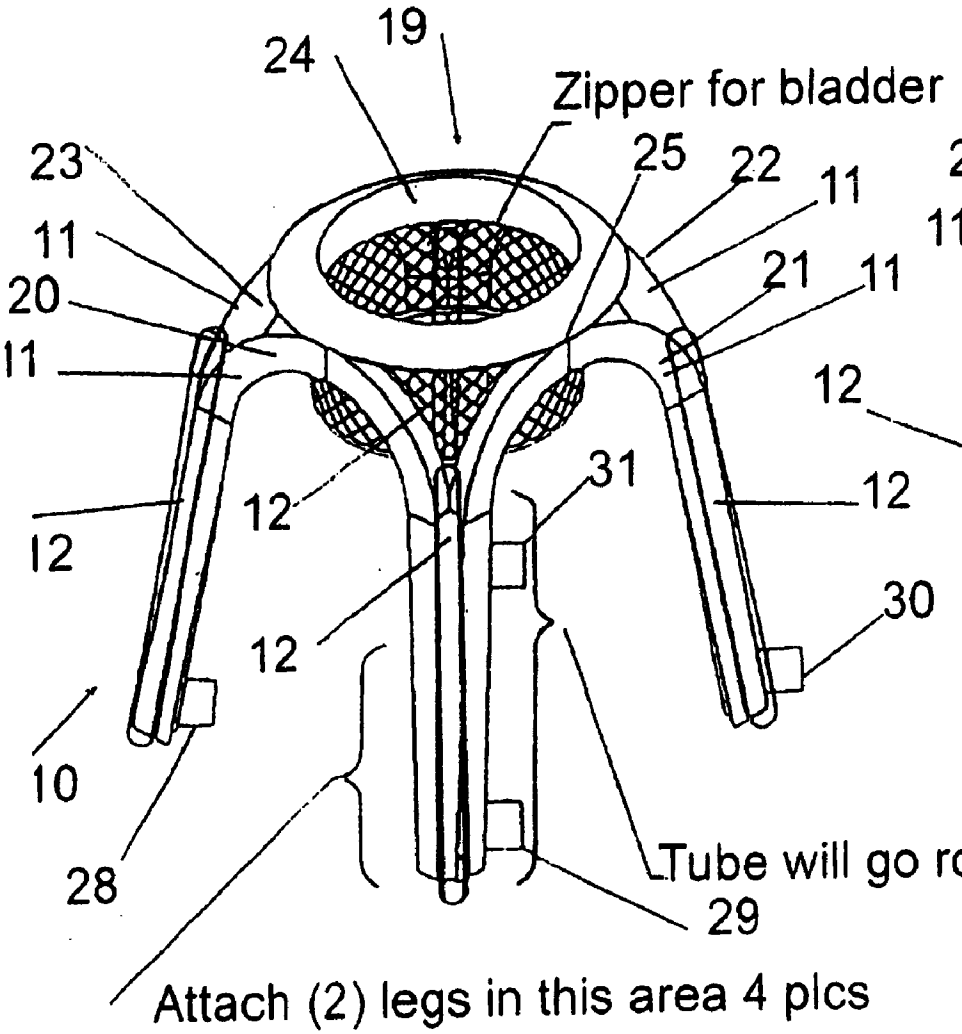
FIG. 5 is an isometric view of the sports goal of FIG. 1 showing the zippers for the insertion of the inflatable bladders.
Figure 7:
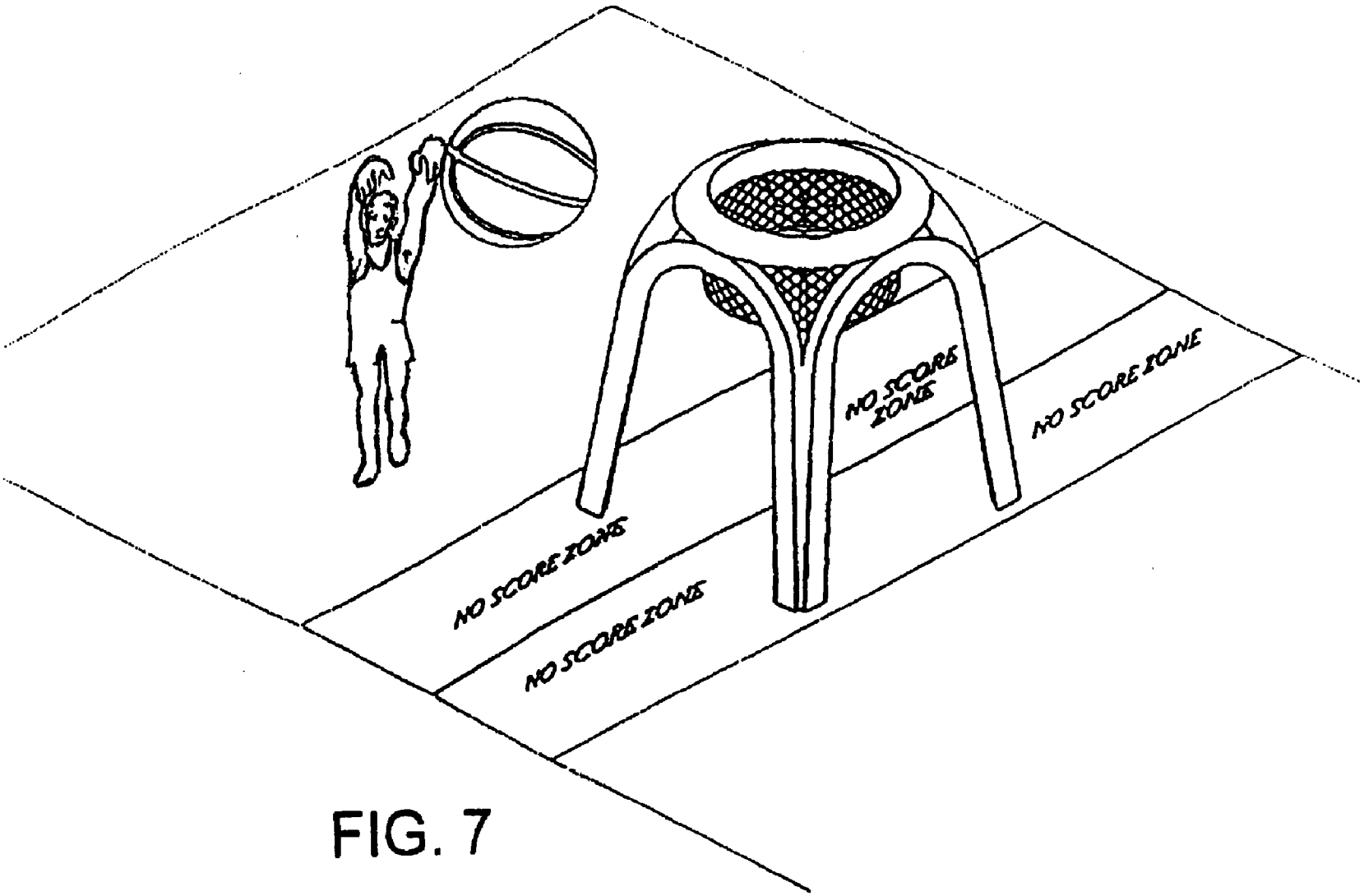
FIG. 7 is an isometric view of the sports goal of FIG. 1 showing the goal, free standing and upright ready for use.
Figure 8:
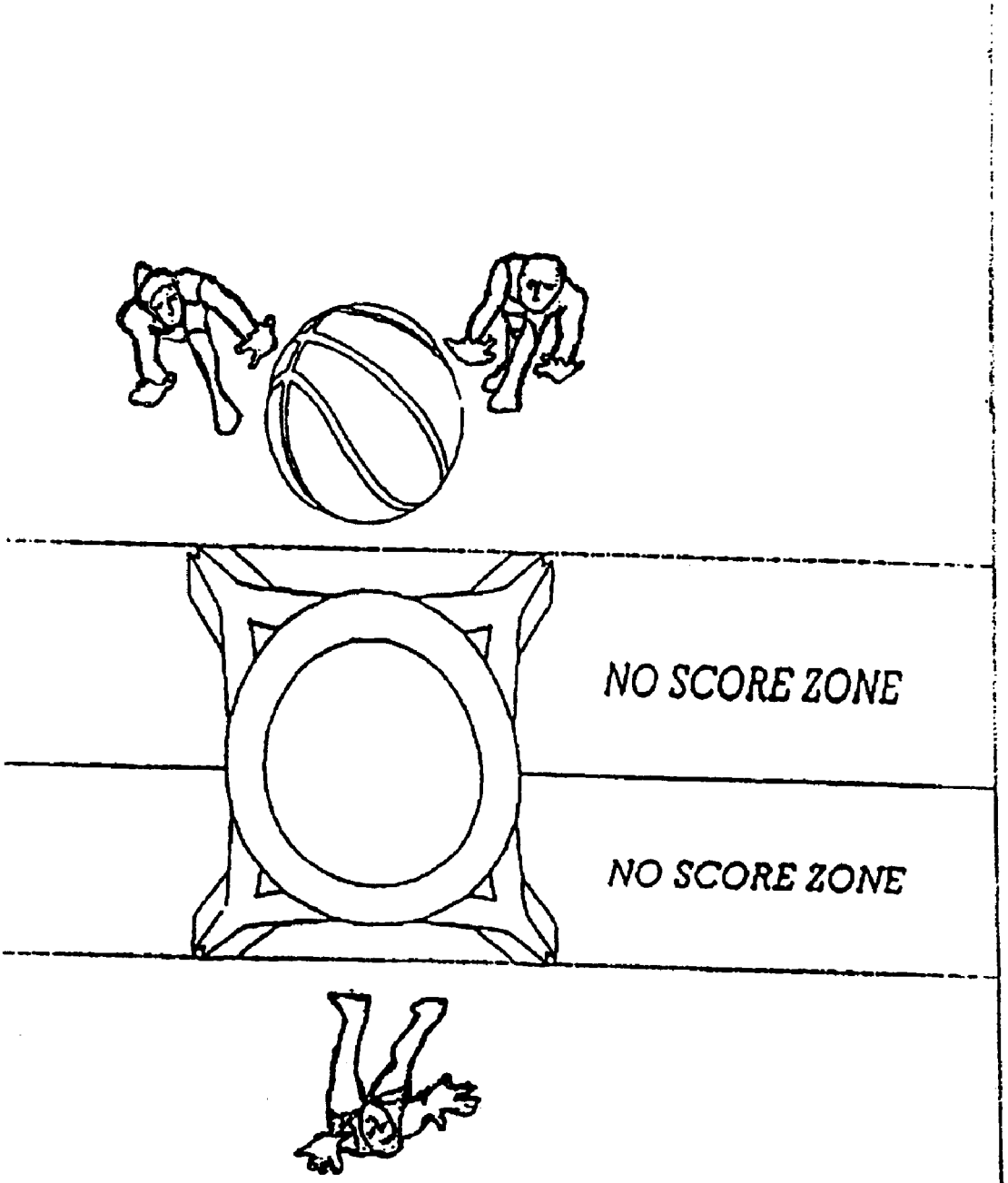
FIG. 8 is a top view of the sports goal ready to receive a ball (Any type) into the round goal area.
Figure 9:
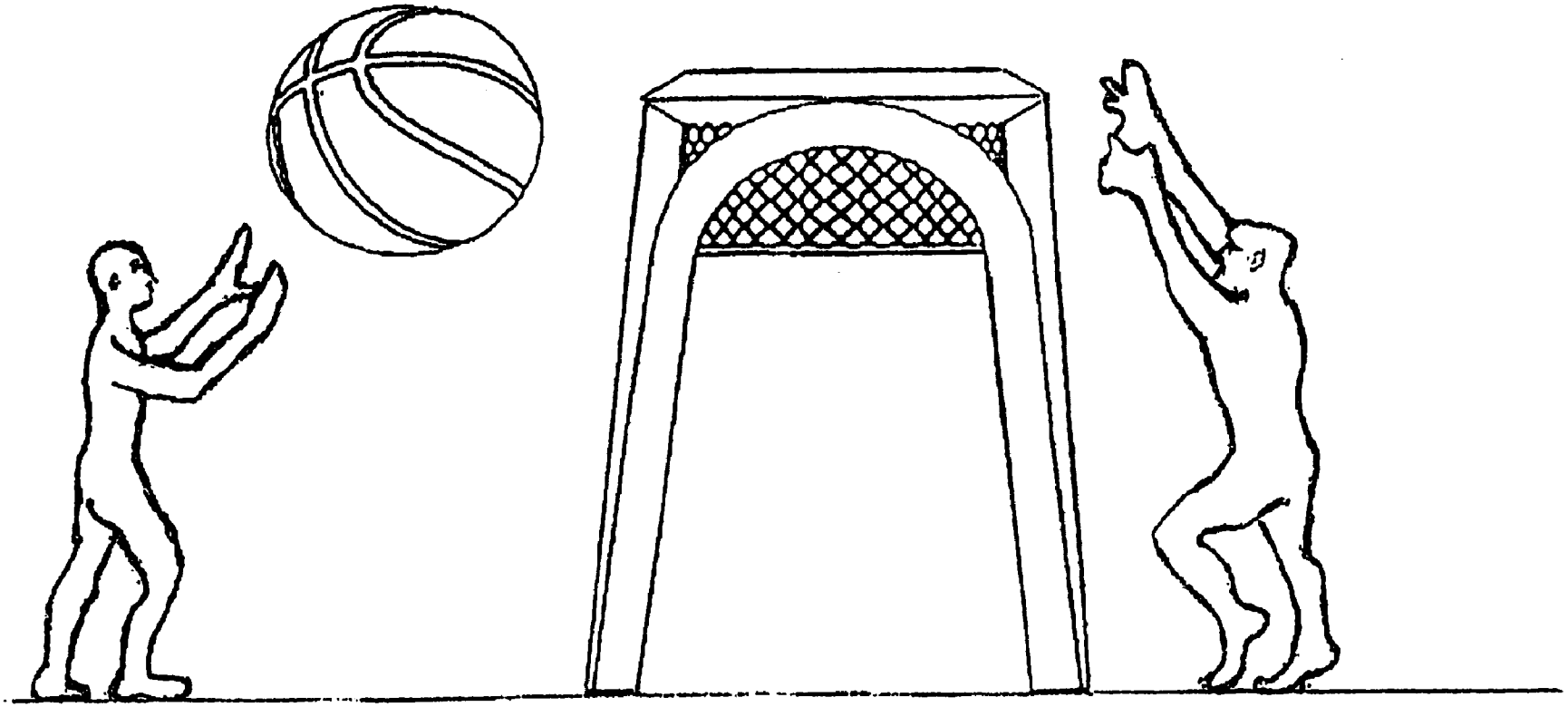
FIG. 9 is a side view of the free standing, upright goal with a ball (Any type) approaching the hoop or goal area.

In that form of the present invention chosen for purposes of illustration, FIGS. 4, 5, and 6 show a sports goal, indicated generally at 10, having four vertical arches with slanted legs 11, with each individual leg joining 12 equally and laterally with the individual leg that corresponds to it realative to the four points that create the square shape at the base from the right legs of the arches 11. The illustration of FIG. 3 shows the top view of the sports goal as generally indicated at 13, where the joining of the large inflatable hoop 14 to the very top of each arch with slanted legs 11 is seen at each individual corresponding place 15. The illustration of FIG. 2 shows a cut out side view of the sports goal as generally indicated at 16, where the position of the joining between the large inflatable hoop 14 and the open ended tubular shaped netting 17 is clearly shown at 18 where it bugs the inner radious of the large inflatable hoop 14. *The sports goal 10 is preferably approximately six feet tall or eight feet tall.*

To provide for quick and easy erection and disassembly to a convient size for portability and storage, the sports goal 10 is formed of an inflatable framework, indicated generally at 19 in FIGS. 4, 5, and 6 and comprising of the five inflatable bladders, as seen at 20, 21, 22, 23, and 24, respectively, together with a casing 25 formed of non-elastic material and carrying the open ended tubular shaped netting 17.

The casing 25 has slits 26 provided at convenient locations equally upon each individual arch with slanted legs 11, as seen in FIG. 1 to allow inflatable bladders 20, 21, 22, and 23 of framework 19 to be inserted therein. The casing 25 has a slit 27 provided at a convenient location upon the large inflatable hoop 14 as seen in FIG. 3 to allow for the inflatable bladder 24 of framework 19 to be inserted therein. Because casing 25 is formed of non-elastic material, it will form a strong and rigid structure when inflatable framework 19 is inserted and inflated.

At the same time, sports goal 10 can quickly and easily be erected or disassembled, when desired, for portability and storage, and, once disassembled, will occupy a minimum of space. Also, sports goal 10 is extremely light and buoyant and, hence, will float on water for use in water basketball and other water sports. Finally, if desired, flaps with hoops 28, 29, 30, and 31 may be provided adjacent the respective pairs of legs 11 of casing 25 to receive suitable weights within vinyl bags, such as stones, sand, and the like to weigh the sports goal to the ground in a desired location.

When deflated, inflatable framework 19 and casing 25 can be folded and stored in a minimum of space and will be quite light, so that sports goal 10 can easily be transported in a suitable carrying case, not shown, to a desired location. At the desired location, inflatable bladders 20, 21, 22, 23, and 24 can be inflated and assembled inside casing 25 and deflated as one complete assembly. Next, the assembled inflatable network 19 can be inserted into slots 26 and 27 of casing 25 to form sports goal 10, as seen in FIGS. 4, 5, and 6. Finally, sports goal 10 can be oriented as desired, and suitable means such as weights can be applied to the flaps 28, 29, 30, and 31 to weigh down the sports goal 10 in a desired position.

Obviously, numerous other variations and modifications can be made without departing from the spirit of the present invention. Therefore, it should be clearly understood that the forms of the present invention described above and shown in the figures of the accompanying drawing, are illustrative only and are not intended to limit the scope of this invention.

INDUSTRIAL APPLICABILITY

Once inflated and assembled, sports goal/hoop is quite rigid and will be extremely strong. Odviously, sports goal/hoop can be mounted on dirt, sand, gymnasium, grass or paved surfaces, as desired, for use with basketball, soccer or any type balls. Alternatively, because framework is inflatable, it is also capable of floating on water. Therefore, sports goal/hoop can be used for water sports, in addition to its use on land.

What is claimed is:

1. A sports goal comprising:

an inflatable goal structure comprising an annular member having a central opening to allow passage therethrough of a ball, and a plurality of leg members supporting said annular member in a horizontal position;

*wherein said goal is substantially void of structure in between at least two adjacent leg members;* wherein said goal structure comprises a plurality of tubes [formed of non-elastic material] with *at least one* valve [means] for facilitating inflation and deflation of said structure;

wherein said goal is approximately eight feet tall.

2. The sports goal of claim 1 wherein[:] said goal is capable of standing on water.

3. The sports goal of claim 1, further comprising: a net encircling the interior of said annular member and extending downwardly therefrom.

4. The sports goal of claim 1 further comprising: ballast means attached to said leg members to aid in maintaining said goal in an upright position.

5. The sports goal of claim 4 further comprising: said ballast [member] *means* comprises a bag filled with material at least as heavy as water.

6. The sports goal of claim 1 further comprising: a [plurally] *plurality* of flaps projecting from said leg members to receive means for anchoring said goal in a desired position.

7. The sports goal of claim 1 further comprising four leg members.

8. The sports goal of claim 1 further comprising an inflatable bladder.

9. A sports goal comprising:

an inflatable goal structure comprising an annular member having a central opening to allow passage therethrough of a ball, and a plurality of leg members supporting said annular member in a horizontal position;

*wherein said goal is substantially void of structure in between at least two adjacent leg members;* wherein said goal structure comprises a plurality of tubes [formed of non-elastic material] with *at least one* valve [means] for facilitating inflation and deflation of said structure;

wherein said goal is approximately six feet tall.

10. The sports goal of claim 9 wherein[:] said goal is capable of standing on water.

11. The sports goal of claim 9 further comprising: a net [encircleing] *encircling* the interior of said annular member and extending downwardly therefrom.

12. The sports goal of claim 9 further comprising: ballast means attached to said leg members to aid in maintaining said goal in an upright position.

13. The sports goal of claim 12 further comprising: said ballast [member] *means* comprises a bag filled with material at least as heavy as water.

14. The sports goal of claim 9 further comprising: a [plurally] *plurality* of flaps projecting from said leg members to receive means for anchoring said goal in a desired position.

15. The sports goal of claim 9 further comprising four leg members.

16. The sports goal of claim 9 further comprising an inflatable bladder.

*17. A sports game comprising:*

*a ball in combination with an inflatable goal structure comprising an annular member having a central opening to allow passage through of said ball and a plurality of spaced apart leg members supporting said annular member in a horizontal position;*

*wherein said goal structure comprises a plurality of tubes with at least one valve for facilitating inflation and deflation of said structure;*

*wherein said goal structure is substantially void of structure in between at least two adjacent leg members;*

*a stability mechanism secured to at least one of said plurality of legs at one point and engaging a playing surface at another point.*

*18. A sports goal comprising:*

*an inflatable goal structure comprising an annular member having a central opening to allow passage therethrough of a ball, and a plurality of leg members supporting said annular member in a horizontal position;*

*an open interior area within said inflatable goal structure between said plurality of leg members and beneath said annular member to allow a ball to travel from said central opening at least along a full length of said plurality of legs;*

*wherein said goal structure comprises a plurality of tubes with at least one valve for facilitating inflation and deflation of said goal structure;*

*wherein said goal is substantially void of structure in between at least two adjacent leg members;*

*wherein said goal structure has a height of at least six feet tall.*

*19. The sports goal of claim 18 wherein said goal is capable of standing on water.*

*20. The sports goal of claim 18 further comprising:*

*a net encircling the interior of said annular member and extending downwardly therefrom.*

*21. The sports goal of claim 18 further comprising:*

*a ballast member attached to said plurality of leg members to aid in maintaining the goal in an upright position.*

*22. The sports goal of claim 21 wherein said ballast member comprises a bag filled with material at least as heavy as water.*

*23. The sports goal of claim 18 further comprising:*

*a plurality of flaps projecting from said plurality of leg members to receive means for anchoring the goal in a desired position.*

*24. The sports goal of claim 18 further comprising:*

*four leg members.*

*25. The sports goal of claim 18 further comprising:*

*an inflatable bladder.*

*26. A sports goal comprising:*

*an air inflatable goal structure comprising an annular member having a central opening to allow passage therethrough of a ball;*

*a plurality of leg members supporting said annular member in a horizontal position;*

*wherein said goal structure includes a plurality of tubes with at least one valve for facilitating inflation and deflation of said goal structure;*

*wherein said goal structure has a height of at least six feet tall;*

*wherein said plurality of legs are spaced apart from one another and are open to allow said ball to be readily removed from an interior of said goal structure.*

*27. A sports goal comprising:*

*an inflatable goal structure comprising an inflated annular member having a central opening to allow passage therethrough of a ball;*

*a plurality of leg members in contact with a playing surface and supporting said horizontally positioned annular member;*

*wherein said goal structure including a plurality of tubes with at least one valve for facilitating inflation and deflation of said goal structure;*

*wherein said playing surface is separate from said goal.*

*28. The sports goal of claim 27 wherein said goal is capable of standing on water.*

*29. The sports goal of claim 28 further comprising:*

*a net encircling the interior of said annular member and extending downwardly therefrom.*

*30. The sports goal of claim 28 further comprising:*

*a ballast member attached to said plurality of leg members to aid in maintaining said goal in an upright position.*

*31. The sports goal of claim 30 wherein said ballast member comprises a bag filled with material at least as heavy as water.*

*32. The sports goal of claim 28 further comprising:*

*a plurality of flaps projecting from said plurality of leg members to receive means for anchoring said goal in a desired position.*

*33. The sports goal of claim 28 further comprising four leg members.*

*34. The sports goal of claim 28 further comprising an inflatable bladder.*

*35. An inflatable sports goal structure comprising:*

*an air inflatable annular member housing a central opening to allow passage therethrough of a ball, said inflatable annular member being oriented horizontal with respect to a playing surface; and*

*a plurality of inflatable leg members attached to and supporting said annular member;*

*said leg members extending from said annular member and in communication with said playing surface to support the sports goal structure in an upright position;*

*wherein said playing surface is separate from said goal.*

*36. The inflatable sports goal structure as set forth in claim 35 further comprising a net member attached to said annular member and positioned in said central opening.*

*37. The inflatable sports goal structure as set forth in claim 36 wherein said net member allows passage therethrough of a ball.*

*38. A sports goal comprising:*

*an inflatable goal structure having an inflatable annular member with a central opening to allow passage therethrough of a ball said inflatable annular;*

*a plurality of inflatable leg members having a predetermined length and supporting said horizontally positioned annular member;*

*said goal structure comprising a plurality of inflatable tubes and at least one valve member for facilitating inflation and deflation of said goal structure; and*

*a goal net positioned in said central opening;*

*wherein a ball passing through said central opening can fall a distance at least as far as said predetermined length of said leg members.*

*39. The sports goal of claim 17, wherein a net is secured to said annular member such that it encompasses said central opening.*

*40. The sports goal of claim 17, wherein said goal structure has a height of at least six feet tall.*

*41. The sports goal of claim 39, wherein a central passageway exists in said inflatable goal structure between said annular member and between said plurality of leg members to allow said ball to pass through the net and come to rest adjacent a playing surface.*

*42. The sports goal of claim 26, wherein a net is secured to said annular member such that it encompasses said central opening.*

*43. The sports goal of claim 26, further comprising:*

*a stability mechanism secured to at least one of said plurality of legs at one point and engaging a playing surface at another point.*

*44. The sports goal of claim 42, wherein a central passageway exists in said inflatable goal structure between said annular member and between said plurality of legs members to allow said ball to pass through the net and come to rest adjacent a playing surface.*

*45. The sports goal of claim 26, wherein said plurality of leg members have a generally arched configuration.*

*46. The sports goal of claim 27, wherein said plurality of leg members have a generally arched configuration.*

* * * * *